United States Patent
Do et al.

(10) Patent No.: US 7,656,466 B2
(45) Date of Patent: Feb. 2, 2010

(54) SUBSTRATE FOR A LIQUID CRYSTAL DISPLAY PANEL, METHOD OF MANUFACTURING THE SAME AND LIQUID CRYSTAL DISPLAY DEVICE HAVING THE SAME

(75) Inventors: Hee-Wook Do, Gyeonggi-do (KR); Chang-Hun Lee, Gyeonggi-do (KR); Hak-Sun Chang, Gyeonggi-do (KR); Jae-Jin Lyu, Gyeonggi-do (KR); Hyun-Wuk Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 486 days.

(21) Appl. No.: 11/304,860

(22) Filed: Dec. 14, 2005

(65) Prior Publication Data

US 2006/0227257 A1    Oct. 12, 2006

(30) Foreign Application Priority Data

Apr. 8, 2005    (KR)    ............... 10-2005-0029217

(51) Int. Cl.
   *G02F 1/1333*    (2006.01)
   *G02F 1/1337*    (2006.01)
(52) U.S. Cl. ................. 349/40; 349/54; 349/129
(58) Field of Classification Search .......... 349/40, 349/158, 54, 129
   See application file for complete search history.

(56) References Cited

U.S. PATENT DOCUMENTS

| 4,432,610 | A  | * | 2/1984 | Kobayashi et al. | ........... | 349/42 |
| 6,400,435 | B2 | * | 6/2002 | Son et al. | ........... | 349/141 |
| 6,525,786 | B1 | * | 2/2003 | Ono | ........... | 349/40 |
| 6,642,972 | B2 | * | 11/2003 | Yoo et al. | ........... | 349/40 |
| 6,657,695 | B1 | * | 12/2003 | Song et al. | ........... | 349/143 |
| 2002/0008824 | A1 | * | 1/2002 | Son et al. | ........... | 349/141 |
| 2003/0020845 | A1 | * | 1/2003 | Lee et al. | ........... | 349/40 |

* cited by examiner

*Primary Examiner*—Mike Qi
(74) *Attorney, Agent, or Firm*—Innovation Counsel LLP (57) ABSTRACT

A substrate for an LCD panel includes an insulation substrate, a light-blocking layer, a color filter layer, a common electrode layer and a static electricity discharging layer. The light-blocking layer is formed on the insulation substrate to define a pixel region. The color filter layer is formed in the pixel region. The common electrode layer is formed on the color filter layer to provide the liquid crystal layer with a common voltage. The static electricity discharging layer discharges static electricity that is induced by an external stimulus to be captured within the substrate. Thus, when the static electricity induced by the external stimulus flows into the LCD panel, the static electricity may be discharged through the static electricity discharging layer, thereby preventing a spot due to the static electricity.

20 Claims, 8 Drawing Sheets

SUBSTRATE FOR A LIQUID CRYSTAL DISPLAY PANEL, METHOD OF MANUFACTURING THE SAME AND LIQUID CRYSTAL DISPLAY DEVICE HAVING THE SAME

CROSS-REFERENCE TO RELATED APPLICATIONS

This application claims priority from Korean Patent Application No. 2005-29217 filed on Apr. 8, 2005, the contents of which are herein incorporated by reference in its entirety.

BACKGROUND OF THE INVENTION

1. Field of the Invention

The present invention relates to a substrate for a liquid crystal display panel, a method of manufacturing the substrate and a liquid crystal display device having the substrate. More particularly, the present invention relates to a substrate for a liquid crystal display panel capable of increasing an optical transmissivity and reducing manufacturing cost, a method of manufacturing the substrate and a liquid crystal display device having the substrate.

2. Description of the Related Art

Generally, a liquid crystal display (LCD) device displays an image using liquid crystal. The LCD device has many merits such as lightweight, thin thickness, low driving voltage and low power consumption. Thus, the LCD device is used in various fields.

The LCD device includes an LCD panel. The LCD panel includes a thin film transistor (TFT) switching each pixel, an array substrate on which TFTs are formed, a counter substrate on which a common electrode layer is formed and a liquid crystal layer interposed between the array substrate and counter substrate to change an optical transmissivity thereof in response to an electrical signal externally provided.

A voltage is applied to the liquid crystal layer to control an optical transmissivity thereof, such that the LCD panel displays an image. The LCD panel displays an image using light passing through a portion that is not shielded by liquid crystal molecules of the liquid crystal layer. Thus, the LCD has a narrow viewing angle when compared with the other display devices such as a cathode ray tube (CRT) type display device.

In order to overcome the above problems, various methods such as a multi-domain method, a phase compensation method, an in-plane switching (IPS) mode, a vertical alignment (VA) mode and a light path control method have been developed. In the multi-domain method, a pixel is divided into a plurality of regions, so that arrangements of liquid crystal molecules corresponding to the regions are different from one another. Thus, the pixel has a mean characteristic of the regions. In the phase compensation method, a phase difference variation is reduced in accordance with a viewing direction using a phase difference film. In the IPS mode, an electric field of horizontal direction is applied to the liquid crystal layer to twist a liquid crystal direction on a plane substantially parallel with an alignment film. In the VA mode, a vertical alignment film and a liquid crystal having a negative dielectric anisotropy are used. In the light path control method, light emitted from a backlight assembly passes in a direction substantially perpendicular to a liquid crystal cell, and then passes an analyzer to diffuse in various directions.

When static electricity is induced in the LCD panel by making contact with an outside (for example, the static electricity is induced in the LCD panel when undoing a package of the LCD panel), the static electricity is captured within the LCD panel such as an insulation layer formed on the counter substrate and/or the array substrate, so that the static electricity is not discharged through the common electrode layer. The static electricity generates spots on the LCD panel to lower the display quality of the LCD panel.

In order to solve the above problems, when the induced static electricity flows into the LCD panel, various methods of preventing spots have been used.

For example, an anti-static (AS) polarizing film is employed in the LCD panel to prevent the spots. In other words, a conductive material such as metal is formed on a polarizing film, so that static electricity inflowing through the conductive material is externally discharged.

However, when the LCD panel employs the anti-static polarizing film, manufacturing cost of the LCD panel increases and optical transmissivity of the LCD panel is lowered due to the conductive material of the anti-static polarizing film.

SUMMARY OF THE INVENTION

The present invention obviates the above problems and thus the present invention provides a substrate for a liquid crystal display panel capable of preventing a spot due to static electricity.

The present invention also provides a method of manufacturing the above-mentioned substrate.

The present invention also provides a liquid crystal display device having the above-mentioned substrate.

In one aspect of the present invention, a substrate for an LCD panel includes an insulation substrate, a light-blocking layer, a color filter layer, a common electrode layer and a static electricity discharging layer. In the substrate for an LCD panel combined with an array substrate to receive a liquid crystal layer between the substrate and the array substrate, the light-blocking layer is formed on the insulation substrate to define a pixel region. The color filter layer is formed in the pixel region. The common electrode layer is formed on the color filter layer to provide the liquid crystal layer with a common voltage. The static electricity discharging layer discharges static electricity that is induced by an external stimulus to be captured within the substrate.

When the light-blocking layer, for example, includes an organic material, the static electricity discharging layer may be formed between the insulation substrate and the light-blocking layer.

When the light-blocking layer, for example, includes a metal or a metal alloy, the static electricity discharging layer may be formed between the insulation substrate and the light-blocking layer. Alternatively, the static electricity discharging layer may be formed on the insulation substrate, wholly overlapping the light-blocking layer.

In another aspect of the present invention, a method of manufacturing a substrate for an LCD panel that is combined with an array substrate to receive a liquid crystal layer between the substrate and the array substrate includes forming a static electricity discharging layer on an insulation substrate, forming a light-blocking layer on the static electricity discharging layer to define a pixel region, forming a color filter layer in the pixel region and forming a common electrode layer on the color filter layer to provide the liquid crystal layer with a common voltage.

The static electricity discharging layer may be formed on an entire surface of the insulation substrate.

When the light-blocking layer, for example, is formed using an organic material, the static electricity discharging layer may be formed between the light-blocking layer and the insulation substrate.

When the light-blocking layer, for example, is formed using a metal or a metal alloy, the light-blocking layer may be partially overlapped with the color filter layer.

Alternatively, after the light-blocking layer is formed on the insulation substrate using a metal or a metal alloy, the static electricity discharging layer may be formed on an entire surface of the insulation substrate, wholly overlapping the light-blocking layer.

In still another aspect of the present invention, an LCD panel includes an array substrate, a substrate and a liquid crystal layer. The array substrate includes a switching element and a pixel electrode layer electrically connected to the switching element. The substrate faces the array substrate. The substrate includes an insulation substrate, a light-blocking layer formed on the insulation substrate to define a pixel region, a common electrode layer formed in the pixel region and a static electricity discharging layer discharging static electricity that is induced by an external stimulus to be captured within the LCD panel. The liquid crystal layer is interposed between the array substrate and the substrate. Liquid crystal molecules of the liquid crystal layer are rearranged by a voltage difference between the pixel electrode layer and the common electrode layer.

According to the above, a spot due to static electricity inflowing from an outside may be removed, so that an optical transmissivity of the substrate for an LCD panel may be improved.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals refer to similar or identical elements throughout.

Figure 1:
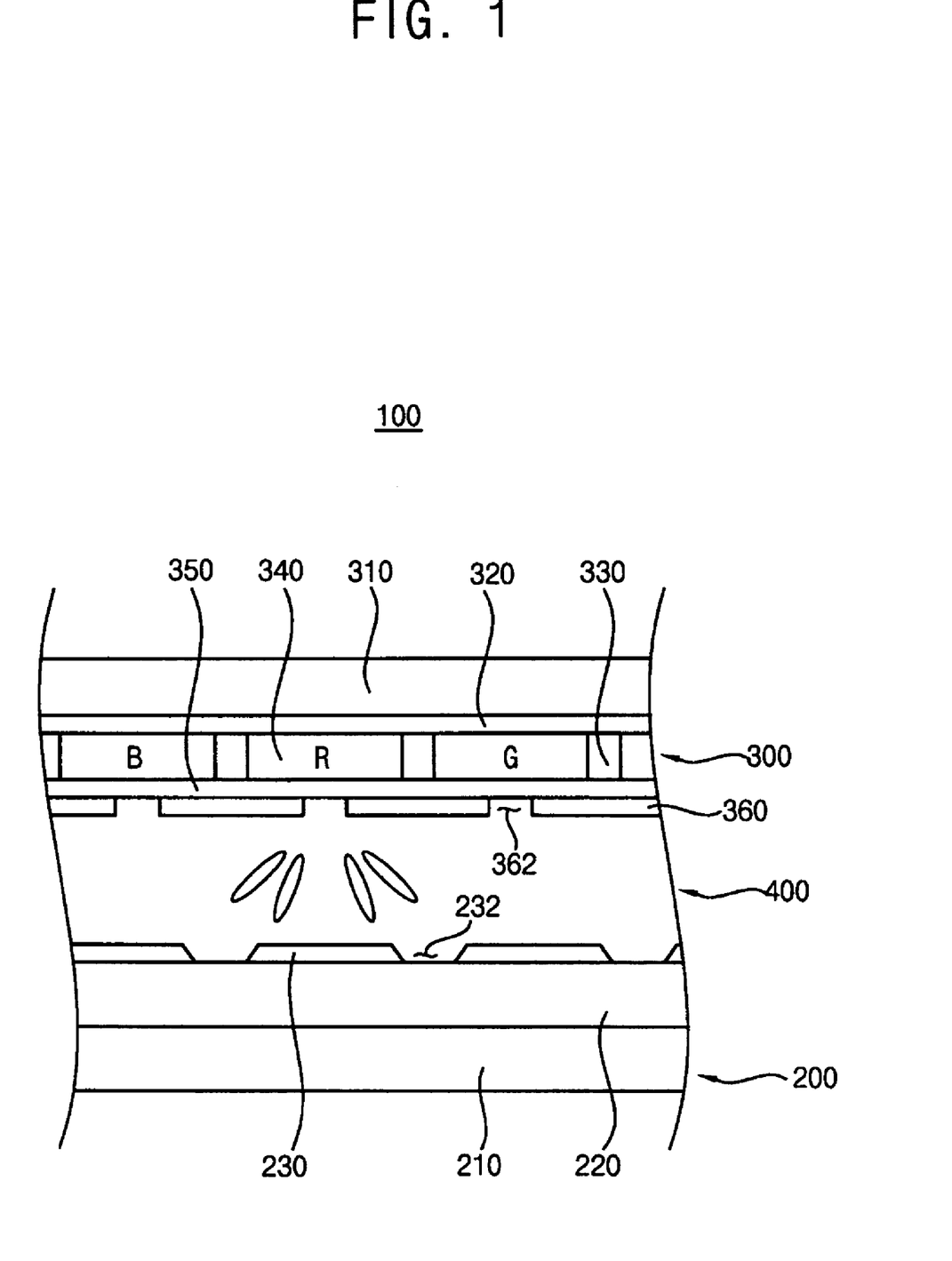
FIG. 1 is a cross-sectional view illustrating an LCD panel according to an exemplary embodiment of the present invention.

FIG. 1 is a cross-sectional view illustrating an LCD panel according to an exemplary embodiment of the present invention.

Referring to FIG. 1, an LCD panel 100 includes an array substrate 200, a counter substrate 300 and a liquid crystal layer 400.

The array substrate 200 includes an insulation substrate 210, a thin film transistor (TFT) array 220 and a pixel electrode layer 230.

The insulation substrate 210, for example, includes a transparent insulating material such as glass.

The TFT array 220 is layered on the insulation substrate 210 and includes a plurality of TFTs (not shown) and a protection layer (not shown) protecting the TFTs.

The pixel electrode layer 230 having a uniform thickness is layered on the TFT array 220. The pixel electrode layer 230, for example, includes a transparent conductive material such as indium tin oxide (ITO), indium zinc oxide (IZO), etc. The pixel electrode layer 230 is electrically connected to a drain electrode of each TFT.

An opening pattern 232 may be formed on the pixel electrode layer 230 to expose the TFT array 220, such that a viewing angle of the LCD panel 100 may be secured. In detail, the opening pattern 232 is formed to distort an electric field generated from the pixel electrode layer 230, thereby generating a fringe field. The fringe field controls angles of liquid crystal molecules with respect to the array substrate 200, so that the viewing angle of the LCD panel 100 may be secured.

The counter substrate 300 corresponds to a substrate for an LCD panel in the claims. A term of "counter substrate" will be used hereinafter for convenience.

The counter substrate 300 includes an insulation substrate 310. The counter substrate 300 further includes a static electricity discharging layer 320, a light-blocking layer 330, a color filter layer 340, an over-coating layer 350 and a common electrode layer 360, which are successively layered on the insulation substrate 310. The insulation substrate 310 includes, for example, a transparent insulating material such as glass. The counter substrate 300 will be described in detail as follows.

Figure 2:
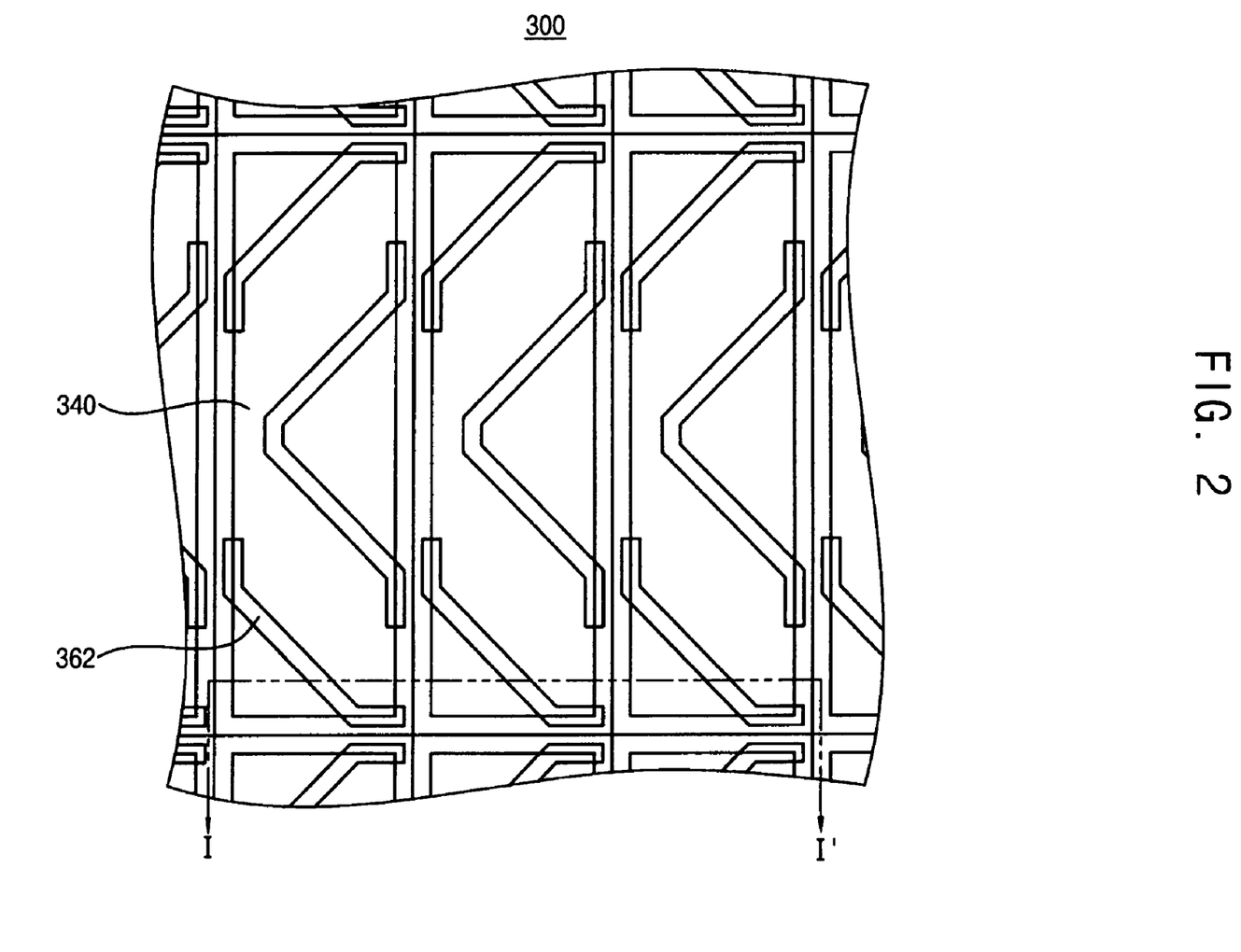
FIG. 2 is a plan view illustrating a counter substrate according to an exemplary embodiment of the present invention.
Figure 3:
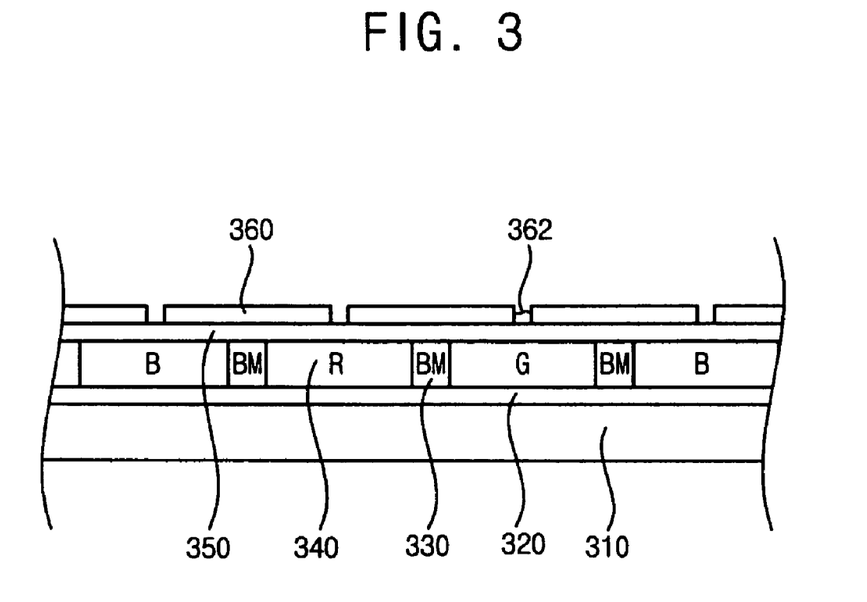
FIG. 3 is a cross-sectional view taken along a line I-I' in FIG. 2.

FIG. 2 is a plan view illustrating a counter substrate according to an exemplary embodiment of the present invention. FIG. 3 is a cross-sectional view taken along a line I-I' in FIG. 2.

Referring to FIGS. 2 and 3, the static electricity discharging layer 320 is formed on the insulation substrate 310. The static electricity discharging layer 320, for example, includes a transparent conductive material such as ITO, IZO, etc.

In one embodiment, ITO or IZO is deposited on an entire surface of the insulation substrate 310 to form the static electricity discharging layer 320. Thus, the static electricity discharging layer 320 is formed as a floating electrode on the insulation substrate 310.

Static electricity is generated at a portion with which the LCD panel 100 externally makes contact. Then, static electric charges are accumulated at the portion when the generated static electricity enters the LCD panel 100. Even if the LCD panel includes the common electrode layer 360, the accumulated static electric charges may not be sufficiently discharged through the common electrode layer 360, so that a spot may be generated when a predetermined pattern is formed on the common electrode layer 360 such as a patterned vertical alignment (PVA) mode.

The static electricity discharging layer 320 is formed as the floating electrode on the entire surface of the insulation substrate 310, and the accumulated charges are discharged through the static electricity discharging layer 320, so that a spot due to static electricity may be prevented. The static electricity discharging layer 320 may be electrically connected to the common electrode layer 360 to have a stable electric potential.

The static electricity discharging layer 320 has a predetermined thickness such that light passing through the static electricity discharging layer 320 may have a constructive interference considering optical refractive indexes of the insulation substrate 310, the light-blocking layer 330, the color filter layer 340, the over-coating layer 350 and the common electrode layer 360.

The light-blocking layer 330 is formed on the static electricity discharging layer 320. The light-blocking layer 330 includes a plurality of openings that expose the static electricity discharging layer 320. The light-blocking layer 330 blocks light. The light-blocking layer 330, for example, includes an organic material such as carbon (C). In detail, an organic layer including, for example carbon, is formed on the static electricity discharging layer 320, and the organic layer is patterned to form a plurality of openings that exposes the static electricity discharging layer 320. Alternatively, the light-blocking layer 330 may be formed directly on the array substrate 200.

The color filter layer 340 is formed on the static electricity discharging layer 320 exposed through the openings. The color filter layer 340 includes a red color filter 'R', a green color filter 'G' and a blue color filter 'B'.

For example, a photoresist layer including red colored pigment or a red colored dyes are coated on the insulation substrate 310 having the light-blocking layer formed thereon, and then the photoresist layer is exposed by using a mask having patterns corresponding to the red color filter 'R', and developed to form the red color filter 'R'. The green color filter 'G and the blue color filter 'B' may be formed through a same process described above.

The over-coating layer 350 protects the RGB color filters of the color filter layer 340, and removes a stepped portion formed by lower layers such as the light-blocking layer 330, the color filter layer 340, etc.

The over-coating layer 350, for example, includes an acryl-group organic layer and/or a polyimide-group organic layer in order to have a flat surface and overcome the stepped portion.

The common electrode layer 360 is formed on the over-coating layer 350 with a uniform thickness. The common electrode layer 360, for example, includes a transparent conductive material such as ITO, IZO, etc.

The common electrode layer 360 may have an opening pattern 362 formed through the common electrode layer 360 in order to form the fringe field. The opening pattern 262 corresponds to the opening pattern 232 of the pixel electrode layer 230 in FIG. 1. The light-blocking layer 330 may be additionally formed on a portion overlapped with the opening pattern 362 to prevent light from passing through the opening pattern 362.

When the opening pattern 362 is formed through the common electrode layer 360, the opening pattern 362 of the common electrode layer 360 and the opening pattern 232 of the pixel electrode layer 230 may preferably be alternately formed such that the liquid crystal layer 400 in FIG. 1 may be defined as a plurality of domains.

The common electrode layer 360 may be formed on the array substrate 200 instead of being formed on the counter substrate 300. For example, in an IPS mode, an electric field of horizontal direction may be applied to the liquid crystal layer 400 to twist a liquid crystal direction on a plane substantially parallel with an alignment film.

Referring again to FIG. 1, the array substrate 200 and the counter substrate 300 are combined with each other, so that the LCD panel 100 receives the liquid crystal layer 400 interposed between the array substrate 200 and the counter substrate 300. Liquid crystal molecules of the liquid crystal layer 400 are rearrangeable in accordance with a voltage difference between the pixel electrode layer 230 and the common electrode layer 360 to control an optical transmissivity.

Figure 4:
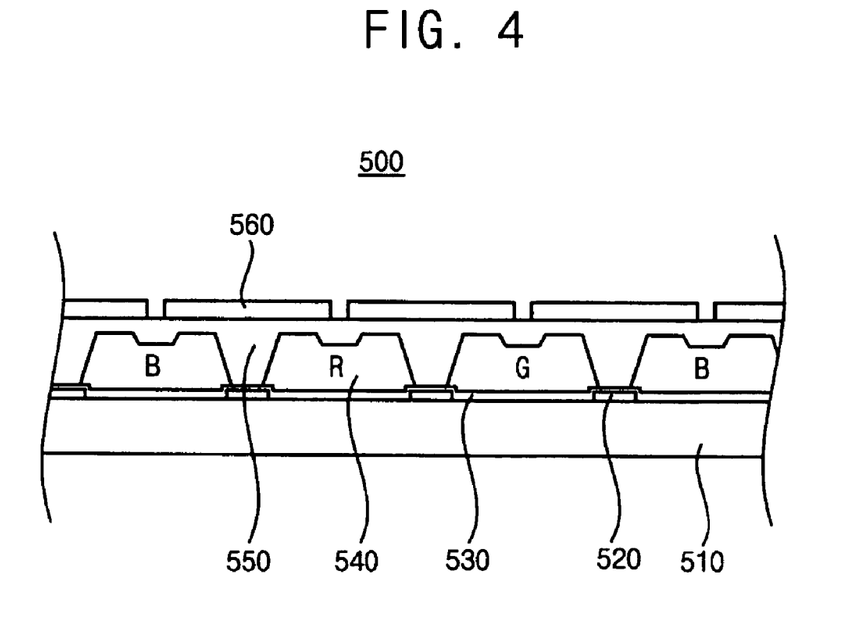
FIG. 4 is a cross-sectional view illustrating a counter substrate according to another exemplary embodiment of the present invention.

FIG. 4 is a cross-sectional view illustrating a counter substrate according to another exemplary embodiment of the present invention.

Referring to FIG. 4, a counter substrate 500 according to another exemplary embodiment of the present invention includes an insulation substrate 510. The counter substrate 500 further includes a light-blocking layer 520, a static electricity discharging layer 530, a color filter layer 540, an over-coating layer 550 and a common electrode layer 560, which are successively layered on the insulation substrate 510. The insulation substrate 510, for example, includes a transparent conductive material such as glass.

The light-blocking layer 520 is formed on the insulation substrate 510. The light-blocking layer 520 includes openings that expose the insulation substrate 510. The light-blocking layer 520 blocks light. The light-blocking layer 520, for example, includes a metallic material such as chromium (Cr), chromium oxide (CrOx), etc.

The light-blocking layer 520 may have a double-layered structure of chromium (Cr) and chromium oxide (CrOx) to prevent reflection of an LCD panel including the counter substrate 500. For example, chromium (Cr) layer are layer are formed on the insulation substrate 510 and chromium oxide (CrOx) are formed on the chromium (Cr) layer, then a portion of the chromium (Cr) layer and the chromium oxide (CrOx) are removed to form the openings, so that the light-blocking layer 520 having the openings are completed.

The static electricity discharging layer 530 is formed on the insulation substrate 510 to cover the light-blocking layer 520. The static electricity discharging layer 530, for example, includes a transparent conductive material such as ITO, IZO, etc. After the light-blocking layer 520 is formed on the insulation substrate 510, ITO or IZO is deposited on the entire surface of the insulation substrate 510 to form the static electricity discharging layer 530.

Accordingly, the static electricity discharging layer 530 is formed as a floating electrode on the entire surface of the insulation substrate 510, and covers the light-blocking layer 520.

As described above, when static electricity that is generated at a portion with which the LCD panel 100 externally makes contact enters the LCD panel 100, the accumulated static electrical charges are discharged through the static electricity discharging layer 530 that is formed as the floating electrode on the entire surface of the insulation substrate 510.

Accordingly a spot due to static electricity may be prevented. The static electricity discharging layer 530 may be electrically connected to the common electrode layer 560 to have a stable electric potential.

The color filter layer 540 is formed on the static electricity discharging layer 530. Each of the RGB color filters of the color filter layer 540 is formed of the static electricity discharging layer 530 such that each of the RGB color filters is disposed over the openings of the light-blocking layer 520, and each of the RGB color filters partially overlapped with the light-blocking layer 520. The color filter layer 540 is formed through a substantially same manufacturing process of the color filter layer 340 in FIGS. 1 to 3. Thus, any further description will be omitted.

The over-coating layer 550 and the common electrode layer 560 are substantially identical to the over-coating layer 350 and the common electrode layer 360 in FIGS. 1 to 3, respectively. Thus, any further description will be omitted.

Figure 5:
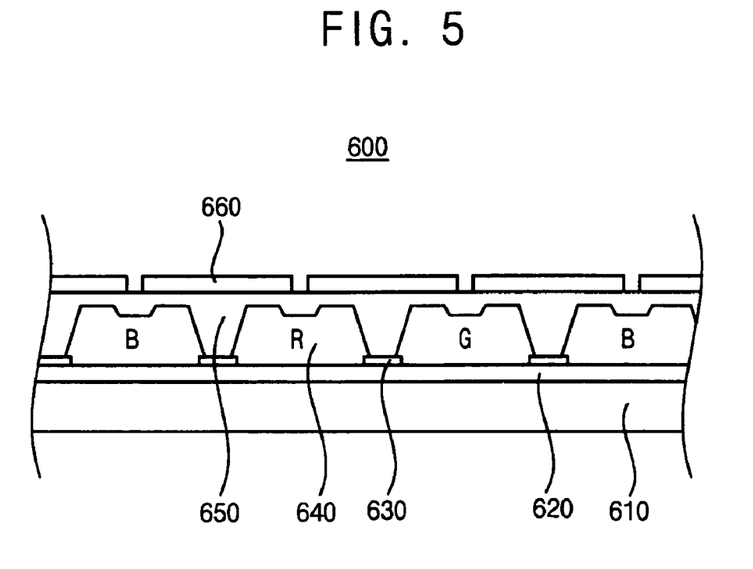
FIG. 5 is a cross-sectional view illustrating a counter substrate according to still another exemplary embodiment of the present invention.

FIG. 5 is a cross-sectional view illustrating a counter substrate according to still another exemplary embodiment of the present invention.

Referring to FIG. 5, a counter substrate 600 according to still another exemplary embodiment of the present invention includes an insulation substrate 610. The counter substrate 600 further includes a static electricity discharging layer 620, a light-blocking layer 630, a color filter layer 640, an over-coating layer 650 and a common electrode layer 660, which are successively layered on the insulation substrate 610.

The static electricity discharging layer 620 is formed on the insulation substrate 610. The static electricity discharging layer 620, for example, includes a transparent conductive material such as ITO, IZO, etc.

In one embodiment, ITO or IZO is deposited on an entire surface of the insulation substrate 610 to form the static electricity discharging layer 620. Thus, the static electricity discharging layer 620 is formed as a floating electrode on the entire surface of the insulation substrate 610.

Static electricity is generated at a portion with which the LCD panel 100 externally makes contact. When the generated static electricity enters the LCD panel 100, the static electricity discharging layer 620 that is formed as the floating electrode on the entire surface of the insulation substrate 610 discharges the static electricity as described in FIGS. 1 to 4, thereby preventing a spot due to the static electricity.

The light-blocking layer 630 is formed on the static electricity discharging layer 620. The light-blocking layer 630 includes a plurality of openings that expose the light-blocking layer 630. The light-blocking layer 630 blocks light.

The light-blocking layer 630, for example, includes a metallic material such as chromium (Cr), chromium oxide (CrOx), etc. The light-blocking layer 630 may have a double-layered structure of chromium (Cr) and chromium oxide (CrOx) to prevent reflection of an LCD panel including the counter substrate 600. For example, chromium (Cr) layer are layer are formed on the insulation substrate 510 and chromium oxide (CrOx) are formed on the chromium (Cr) layer, and then a portion of the chromium (Cr) layer and the chromium oxide (CrOx) are removed to form the openings, so that the light-blocking layer 520 having the openings are completed.

Alternatively, the light-blocking layer 630 may be formed directly on the array substrate in FIG. 1.

The light-blocking layer 630 may have a predetermined thickness of chromium (Cr) and/or chromium oxide (CrOx) deposited on the insulation substrate 610 to prevent reflection of the LCD panel including the counter substrate 600, which will be described in detail with reference to the accompanying drawings.

Figure 6:
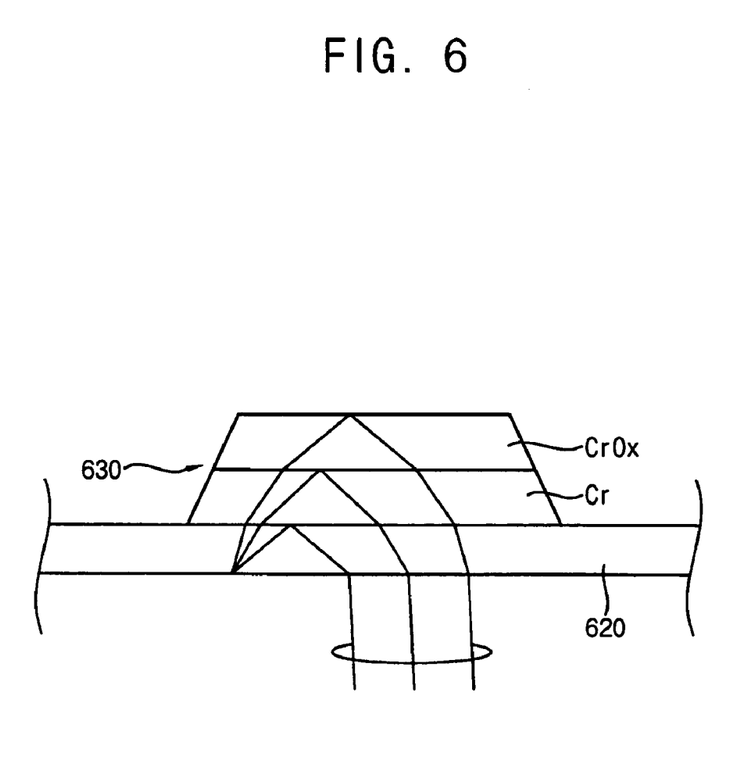
FIGS. 6 and 7 are cross-sectional views illustrating an optical reflectivity of a light-blocking layer shown in FIG. 5 in accordance with a thickness thereof.
Figure 7:
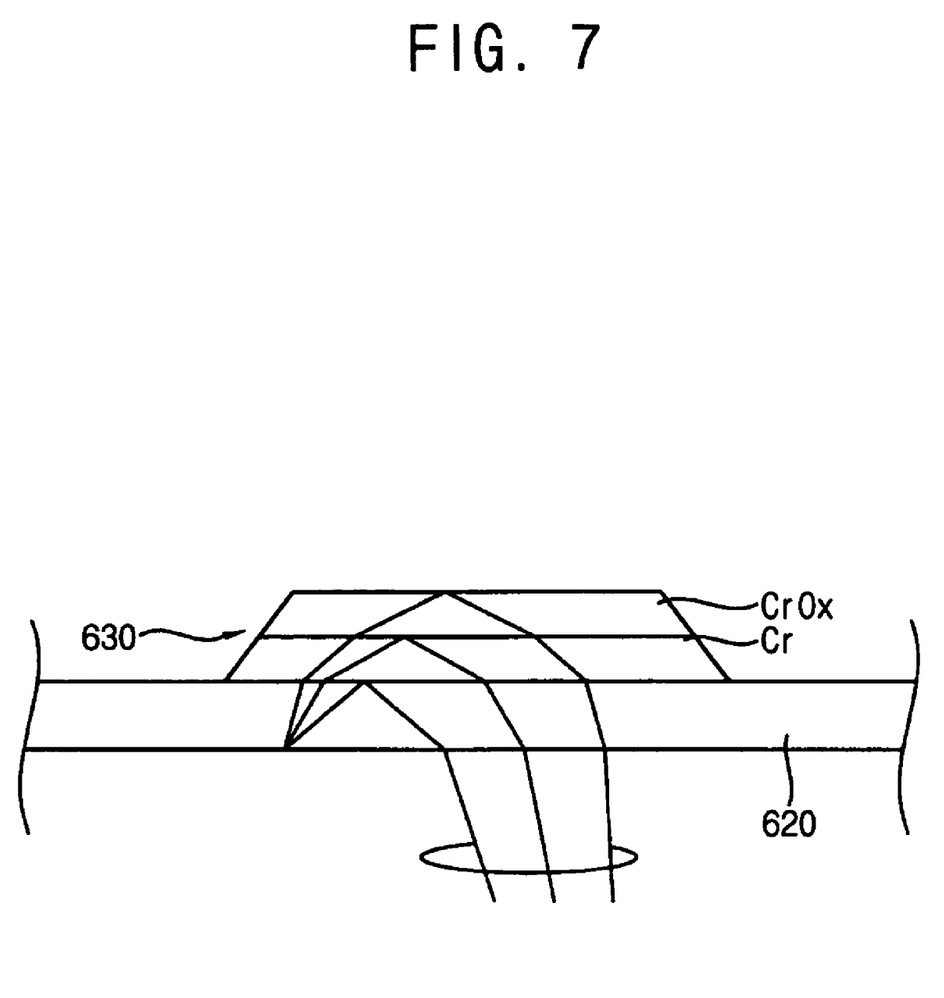

FIGS. 6 and 7 are cross-sectional views illustrating an optical reflectivity of a light-blocking layer shown in FIG. 5 in accordance with a thickness thereof.

Referring to FIGS. 6 and 7, the light-blocking layer 630 has a double-layered structure of chromium (Cr) and chromium oxide (CrOx). Incident light via a transparent conductive material such as ITO, IZO, etc. is reflected or transmitted in accordance with the incident angle of light.

However, as shown in FIGS. 6 and 7, light passing through two different mediums is reflected when the light has a predetermined incident angle at the incident surface of each of the mediums. The reflected light exits the counter substrate 600. Here, with respect to incident surfaces each of which having a substantially same size, as a thickness of medium increases, a canceled amount of light decreases.

Accordingly, a first thickness of chromium (Cr) and a second thickness of chromium oxide (CrOx) of the light-blocking layer 630 may be controlled to increase a canceled amount of light, thereby reducing an optical reflectivity of the light-blocking layer 630.

When the static electricity discharging layer 620 is formed on the light-blocking layer 630 as in FIG. 4, a ratio of the first thickness with respect to the second thickness may not be controlled. When the static electricity discharging layer 620 is formed under the light-blocking layer 630 as in FIG. 5, the ratio may be controlled.

The color filter layer 640 is formed on the static electricity discharging layer 620. Each of the RGB color filters of the color filter layer 640 is partially overlapped with the light-blocking layer 630. The color filter layer 640 is substantially identical to the color filter layer 340 in FIGS. 1 to 3 except for the color filter layer 640 being partially overlapped with the light-blocking layer 630. Thus, any further description will be omitted.

The over-coating layer 650 and the common electrode layer 660 are substantially identical to the over-coating layer 350 and the common electrode layer 360, respectively, as shown in FIGS. 1 to 3. Thus, any further description will be omitted.

Hereinafter, simulated results for inspecting whether an LCD panel including the static electricity discharging layer according to the present invention is normally driven will be described in detail with reference to the accompanying drawings.

Figure 8:
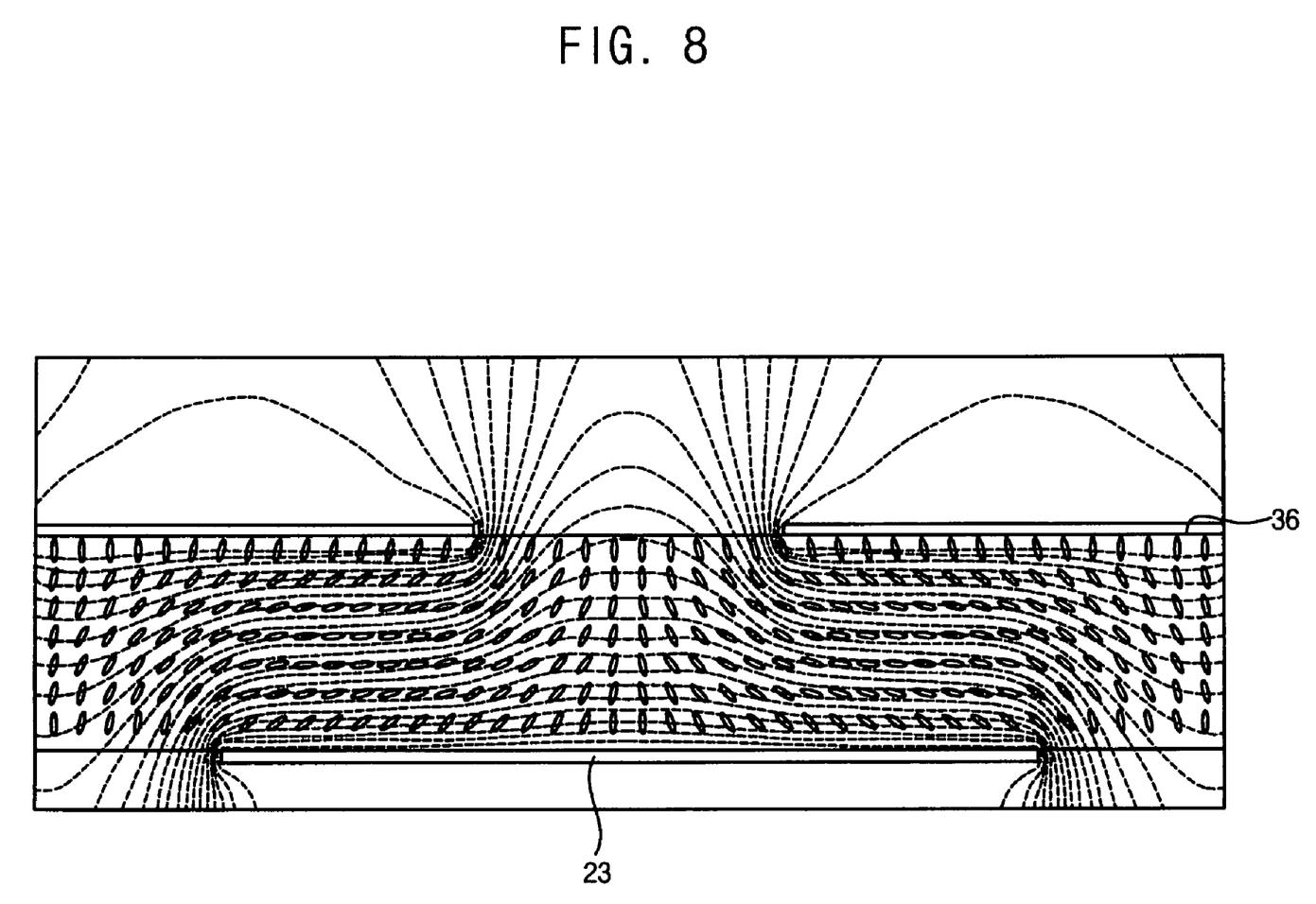
FIG. 8 is a cross-sectional view illustrating an arrangement of liquid crystal molecules according to a comparative example.

FIG. 8 is a cross-sectional view illustrating an arrangement of liquid crystal molecules according to a comparative example.

Referring to FIG. 8, when an LCD panel including an anti-static polarizing film is driven, liquid crystal molecules are rearranged by an electric field generated between a pixel electrode layer 23 formed on an array substrate and a common electrode layer 36 formed on a counter substrate to control an optical transmissivity.

For example, when a common voltage of about 5V is applied to the common electrode layer 36, and a pixel voltage of about 0V to about 10V is applied to the pixel electrode layer 23, vertically aligned liquid crystal molecules are rearranged by a distorted electric field that is generated in accordance with patterns of the common electrode layer 36 and the pixel electrode layer 23. An optical transmissivity of light passing through a liquid crystal layer may be controlled.

Figure 9:
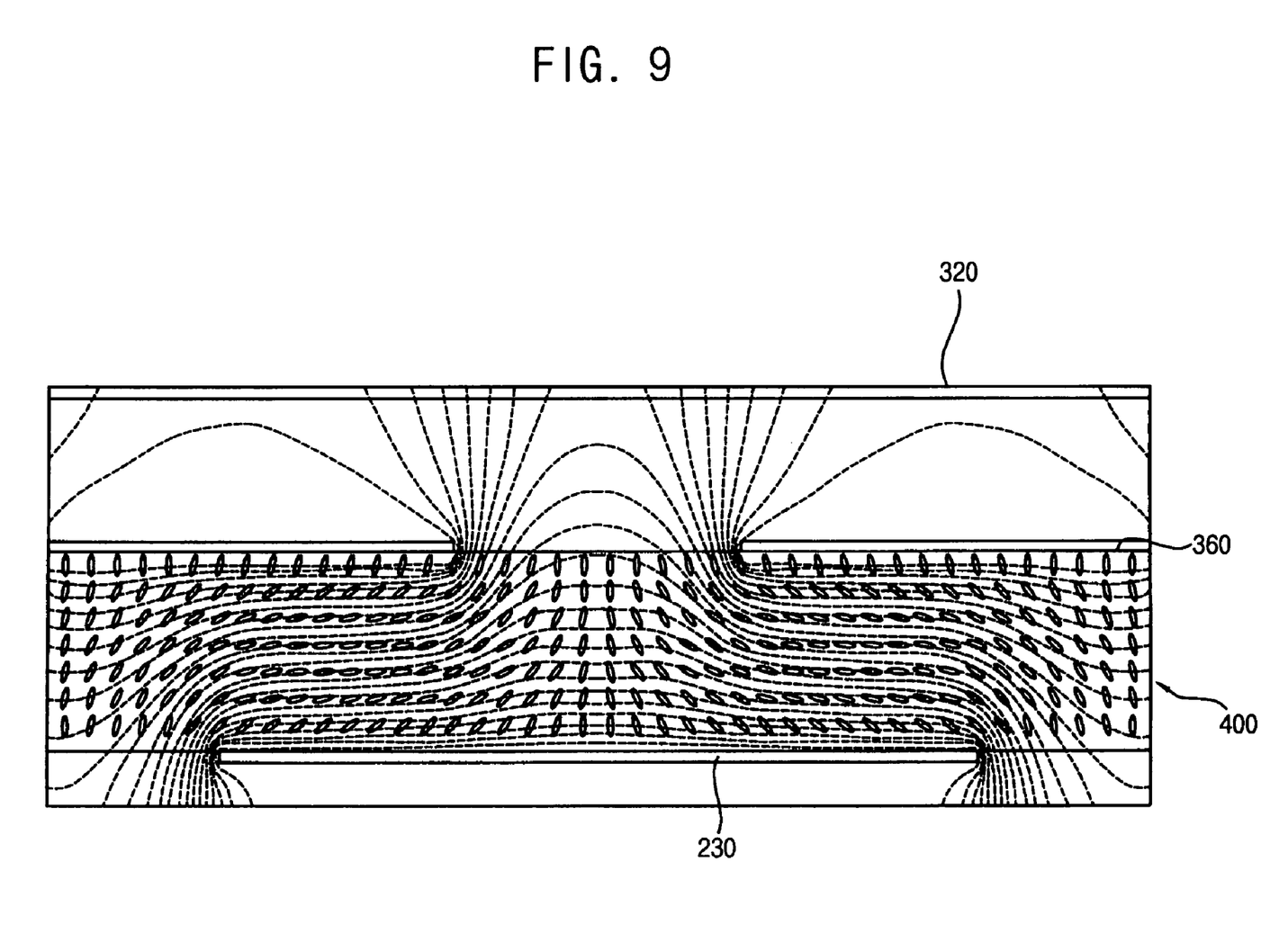
FIGS. 9 and 10 are cross-sectional views illustrating an arrangement of liquid crystal molecules according to the present invention.
Figure 10:
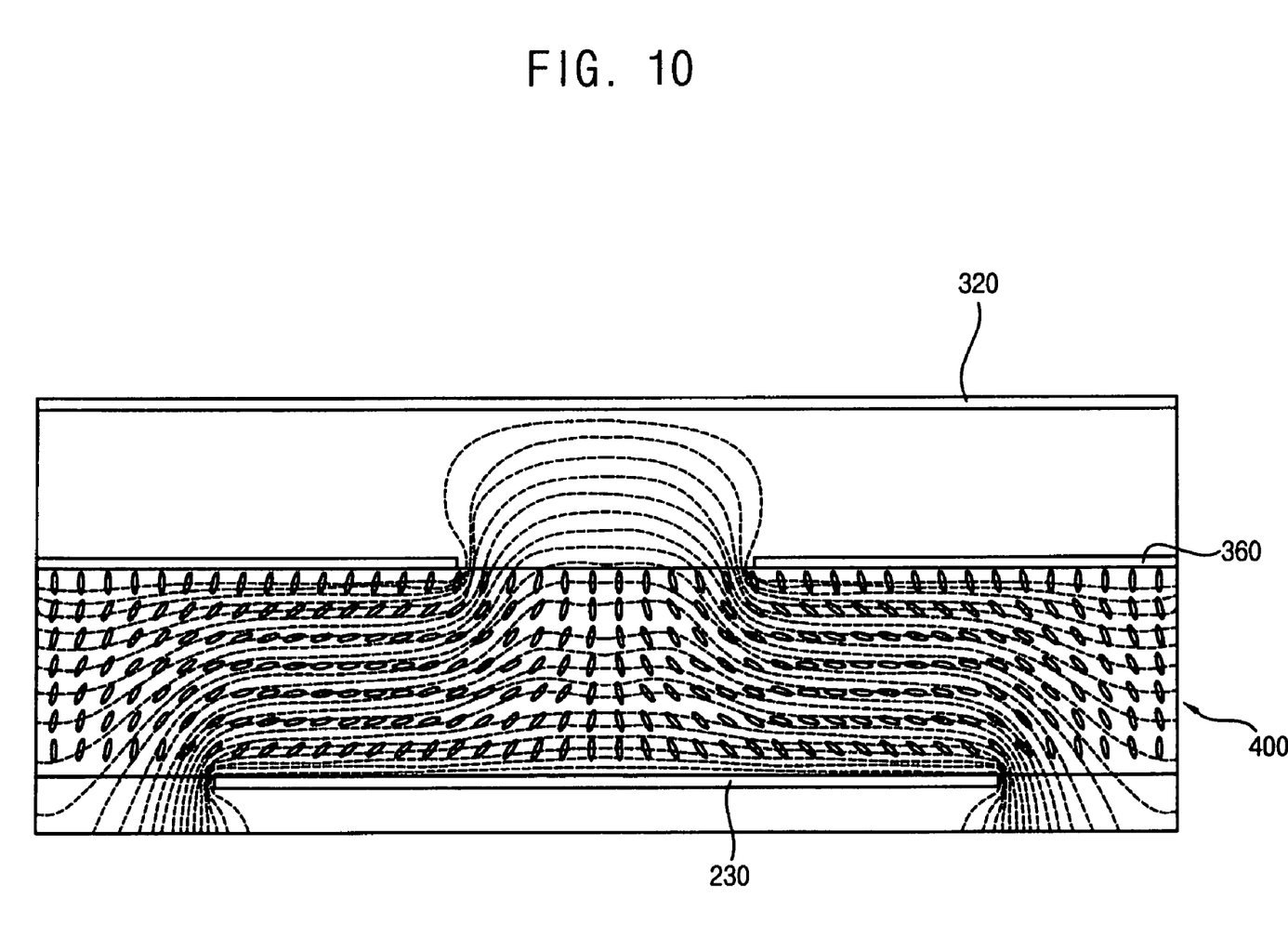

FIGS. 9 and 10 are cross-sectional views illustrating an arrangement of liquid crystal molecules according to the present invention.

In FIG. 9, a simulated result of an arrangement of liquid crystal molecules is shown when a static electricity discharging layer according to the present invention is electrically floated. Particularly, FIG. 9 illustrates a simulated result when an anti-static treatment on a polarizing film of an LCD panel having a PVA mode is omitted, and a static electricity discharging layer 320 is formed.

Referring to FIG. 9, when the static electricity discharging layer 320 is completely floated, and same common voltage and same pixel voltage as described in FIG. 8 are applied to a common electrode layer and a pixel electrode layer, respectively, an arrangement of liquid crystal molecules of an LCD panel is substantially same as the LCD panel having a PVA mode in FIG. 8.

As described above, even though the static electricity discharging layer is formed on the counter substrate according to the present invention and an electrical signal is not applied to the static electricity discharging layer, an arrangement of liquid crystal molecules is substantially constant when driving the LCD panel.

In FIG. 10, a simulated result of an arrangement of liquid crystal molecules is shown when a predetermined electric filed is applied to a static electricity discharging layer according to the present invention. Particularly, FIG. 10 illustrates a simulated result when an anti-static treatment on a polarizing film of an LCD panel having a PVA mode is omitted, and a static electricity discharging layer 320 is formed.

Referring to FIG. 10, a same common voltage and a same pixel voltage as in FIG. 8 are applied to the common electrode layer 360 and the pixel electrode layer 230, respectively. When the static electricity discharging layer 320 is induced by the common voltage applied to the common electrode layer 360, or when the static electricity discharging layer 320 is electrically connected to the common electrode layer 360 to have a predetermined voltage, the LCD panel has substantially same arrangement of liquid crystal molecules as the LCD panel having an anti-static polarizing film shown in FIG. 8.

As described above, even though the static electricity discharging layer is formed on the counter substrate according to the present invention and an induced current or an electrical signal is applied to the static electricity discharging layer, an arrangement of liquid crystal molecules is substantially constant when driving the LCD panel.

Accordingly, an anti-static treatment process for preventing a spot due to static electricity may be omitted, so that manufacturing cost of an LCD panel may be reduced and an optical transmissivity of the LCD panel may be improved. In addition, the LCD panel may have an equivalent viewing angle to an LCD panel manufactured through an anti-static treatment process.

According to the above, the present invention is applied to a PVA mode that a predetermined pattern is formed on a common electrode of a counter substrate facing an array substrate. However, the present invention is not limited to the PVA mode. For example, the present invention may be applied to an IPS mode of which a common electrode is not formed on a counter substrate.

In addition, the present invention is applied to a color filter substrate on which a color filter layer is formed. However, the present invention is not limited to the color filter substrate. For example, the present invention may be applied to an array substrate on which a color filter layer and a light-blocking layer are formed.

According to the present invention, when static electricity generated by making contact with an outside flows into an LCD panel, the static electricity may be discharged by a floating electrode formed on an entire surface of the LCD panel, thereby preventing a spot due to static electricity.

In addition, an anti-static treatment process for discharging static electricity that flows into the LCD panel may be omitted, so that manufacturing cost of the LCD panel may be reduced.

Furthermore, the anti-static treatment process is omitted, so that loss of an optical transmissivity of the LCD panel may be prevented by omitting a use of conductive metal for the anti-static treatment process.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A substrate for a liquid crystal display (LCD) panel combined with an array substrate to receive a liquid crystal layer between the substrate and the array substrate, comprising:
    an insulation substrate;
    a static electricity discharging layer formed on the insulation substrate, wherein the static electricity discharging layer is configured to discharge static electricity that is induced by an external stimulus to be captured within the substrate;
    a light-blocking layer formed on the insulation substrate to define a pixel region;
    a color filter layer formed on the static electricity discharging layer in the pixel region; and
    a common electrode layer formed on the color filter layer to provide the liquid crystal layer with a common voltage;
    wherein the static electricity discharging layer is formed between the insulation substrate and the light-blocking layer.

2. The substrate of claim 1, wherein the light-blocking layer includes an organic material.

3. The substrate of claim 2, wherein the static electricity discharging layer is formed on an entire surface of the insulation substrate.

4. The substrate of claim 1, wherein the light-blocking layer includes a metal or a metal alloy.

5. The substrate of claim 4, wherein the static electricity discharging layer is formed under the light-blocking layer.

6. The substrate of claim 5, wherein the light-blocking layer is partially overlapped with the color filter layer.

7. The substrate of claim 4, wherein the static electricity discharging layer wholly overlaps the light-blocking layer and is formed on an entire surface of the insulation substrate.

8. The substrate of claim 1, wherein the static electricity discharging layer includes at least one of indium tin oxide and indium zinc oxide.

9. The substrate of claim 8, wherein the common electrode layer includes an opening pattern disposed in the pixel region.

10. A method of manufacturing a substrate for an LCD panel combined with an array substrate to receive a liquid crystal layer between the substrate and the array substrate, comprising:
    forming a static electricity discharging layer on an insulation substrate;
    forming a light-blocking layer on the static electricity discharging layer to define a pixel region; forming a color filter layer in the pixel region; and
    forming a common electrode layer on the color filter layer to provide the liquid crystal layer with a common voltage.

11. The method of claim 10, wherein the static electricity discharging layer is formed on an entire surface of the insulation substrate.

12. The method of claim 11, wherein the light-blocking layer is formed by forming an organic layer on the static electricity discharging layer; and patterning the organic layer to form a plurality of openings corresponding to the pixel region.

13. The method of claim 12, wherein the light-blocking layer is formed using a metal or a metal alloy, and is partially overlapped with the color filter layer.

14. The method of claim 13, further comprising removing a portion of the common electrode to form an opening pattern in the pixel region.

15. A method of manufacturing a substrate for an LCD panel combined with an array substrate to receive a liquid crystal layer between the substrate and the array substrate, comprising:

forming a light-blocking layer on an insulation substrate to define a pixel region;

forming a static electricity discharging layer on the insulation substrate, the static electricity discharging layer overlapping the light-blocking layer; forming a color filter layer in the pixel region; and forming a common electrode layer on the color filter layer to provide the liquid crystal layer with a common voltage.

16. The method of claim 15, wherein the light-blocking layer is formed using a metal or a metal alloy.

17. The method of claim 16, further comprising removing a portion of the common electrode to form an opening pattern in the pixel region.

18. An LCD panel comprising:

an array substrate including a switching element and a pixel electrode layer electrically connected to the switching element;

a substrate facing the array substrate, comprising:

an insulation substrate;

a static electricity discharging layer formed on the insulation substrate, wherein the static electricity discharging layer is configured to discharge static electricity that is induced by an external stimulus to be captured within the LCD panel;

a light-blocking layer formed on the insulation substrate to define a pixel region;

a color filter layer formed on the static electricity discharging layer in the pixel region;

a common electrode layer formed in the pixel region; and a liquid crystal layer interposed between the array substrate and the substrate, liquid crystal molecules of the liquid crystal layer being rearranged by a voltage difference between the pixel electrode layer and the common electrode layer;

wherein the static electricity discharging layer is formed between the insulation substrate and the light-blocking layer.

19. The LCD panel of claim 18, wherein the common electrode layer and the pixel electrode layer have an opening portion in the pixel region to form a pattern shape.

20. The LCD panel of claim 19, wherein the opening portion comprises a first opening portion formed at the pixel electrode layer and a second opening portion formed at the common electrode layer, the first and second opening portions being alternately formed to define the liquid crystal layer as a plurality of domains in the pixel region.

* * * * *